US012070850B1

United States Patent
Coleman et al.

(10) Patent No.: US 12,070,850 B1
(45) Date of Patent: Aug. 27, 2024

(54) MULTI-PISTON, VACUUM GRIPPER ASSEMBLY

(71) Applicant: Amazon Technologies, Inc., Seattle, WA (US)

(72) Inventors: Gregory Coleman, Somerville, MA (US); Timothy G Dietz, Reading, MA (US); Leonard Thomas Lilliston, III, Sudbury, MA (US); Beth A Marcus, Bedford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 960 days.

(21) Appl. No.: 16/587,652

(22) Filed: Sep. 30, 2019

Related U.S. Application Data

(60) Provisional application No. 62/847,907, filed on May 14, 2019.

(51) Int. Cl.
*B25J 15/06* (2006.01)
*B25J 9/12* (2006.01)

(52) U.S. Cl.
CPC ........... *B25J 15/0616* (2013.01); *B25J 9/123* (2013.01)

(58) Field of Classification Search
CPC .... B25J 9/123; B25J 15/0616; B25J 15/0683; B66C 1/0243; B66C 1/025; B66C 1/0287
See application file for complete search history.

(56) References Cited

U.S. PATENT DOCUMENTS

| | | | | |
|---|---|---|---|---|
| 4,527,783 A | * | 7/1985 | Collora | B25B 11/005 269/297 |
| 9,682,788 B2 | * | 6/2017 | Hunt | B21D 31/005 |
| 11,267,090 B2 | * | 3/2022 | Rubio Mateos | B23Q 5/26 |
| 11,453,179 B2 | * | 9/2022 | Reinhold | B32B 7/12 |
| 2006/0046396 A1 | * | 3/2006 | Harless | H01L 21/68728 438/270 |
| 2010/0058851 A1 | * | 3/2010 | Lawrence | G01L 5/282 73/123 |
| 2011/0101586 A1 | * | 5/2011 | Lands | B25H 1/0007 269/57 |
| 2014/0360348 A1 | * | 12/2014 | Kopp | F15B 15/06 91/159 |
| 2015/0121830 A1 | * | 5/2015 | Gahres | A01D 34/008 56/153 |
| 2021/0063480 A1 | * | 3/2021 | Toben-Heiken | H01Q 1/50 |

FOREIGN PATENT DOCUMENTS

JP          4098361 B2 * 6/2008   ............. A21C 11/02

* cited by examiner

*Primary Examiner* — Saul Rodriguez
*Assistant Examiner* — Brendan P Tighe
(74) *Attorney, Agent, or Firm* — BakerHostetler

(57) ABSTRACT

A vacuum-gripper end effector conforms to and grasps items upon application of vacuum force and/or actuation of one or more actuators. The vacuum-gripper assembly can be round in top view or can be rectangular. At least three linear actuators deform the vacuum-gripper assembly. Four linear actuators may be spaced equidistantly apart on a square or rectangular vacuum-gripper assembly to enhance functionality of the vacuum-gripper, such as being capable of simultaneously engaging three sides formed at a corner of a box. A one-way actuation type air cylinder may be used. A low friction air cylinder may be returned to its retracted position by the resilience of the vacuum-gripper assembly.

20 Claims, 16 Drawing Sheets

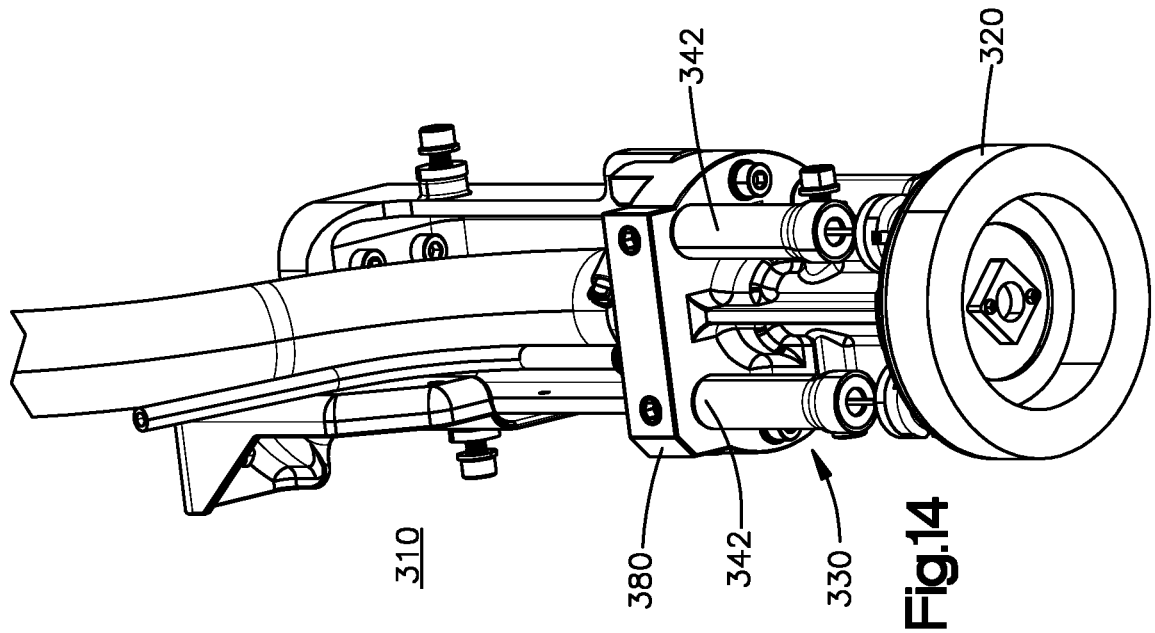
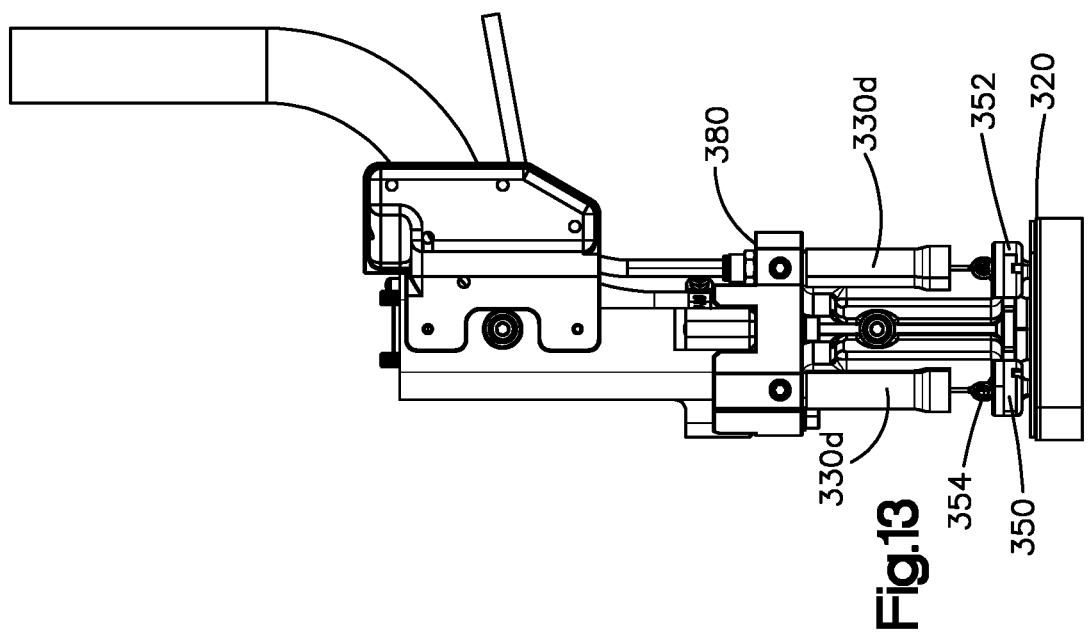

MULTI-PISTON, VACUUM GRIPPER ASSEMBLY

CROSS-REFERENCE TO RELATED APPLICATION

This application claims the benefit of and priority to U.S. Provisional Application No. 62/847,907, filed on May 14, 2019, the disclosure of which is incorporated herein by reference in its entirety.

BACKGROUND

The present disclosure relates to robotic devices and systems, and more particularly to vacuum-gripper type end effectors, and related methods.

In commercial warehouses and material handling facilities (e.g., fulfillment centers and sortation centers), automated processes may employ a variety of robotic devices or systems to manipulate objects, packages, or items. The robotic devices (e.g., robotic arms) often include end effectors that operate to engage items of differing shape, size, and mass, and which can be randomly oriented and/or jumbled together or partially covering each other. Many conventional end effectors include suction cups to engage items, including bellows-type, conical, or flared suction cups. While these types of end effectors can provide reasonable performance for the manipulation of many items, they are incapable of maintaining sufficient contact for manipulation when engaging with a variety of items that are processed in existing material handling facilities (e.g., items having different sizes, shapes, stiffness, deformability, etc.), particularly when the manipulation may include differing velocity or acceleration profiles.

BRIEF DESCRIPTION OF DRAWINGS

FIG. 13 is a side view of the end effector or FIG. 11;

FIG. 14 is a bottom perspective view of the end effector or FIG. 11;

DETAILED DESCRIPTION

A vacuum-gripper end effector conforms to and grasps objects upon application of vacuum force. The vacuum-gripper assembly can be round in top view or can be rectangular or other shapes. At least three linear actuators are capable of deforming the vacuum-gripper assembly. Four linear actuators may be spaced equidistantly apart on a square or rectangular vacuum-gripper assembly to enhance functionality of the vacuum-gripper, such as being capable of simultaneously engaging three sides at a corner of a box. The vacuum-gripper is pliable (that is, readily deformable) and resilient (that is, biased toward a rest or unactuated position). The vacuum-gripper assembly can include a vacuum-gripper body, (optionally) a thin structural ring or plate to enhance a spring bias toward a rest position, and a sealing membrane within the structural ring or plate to seal the vacuum-gripper.

Figure 17:
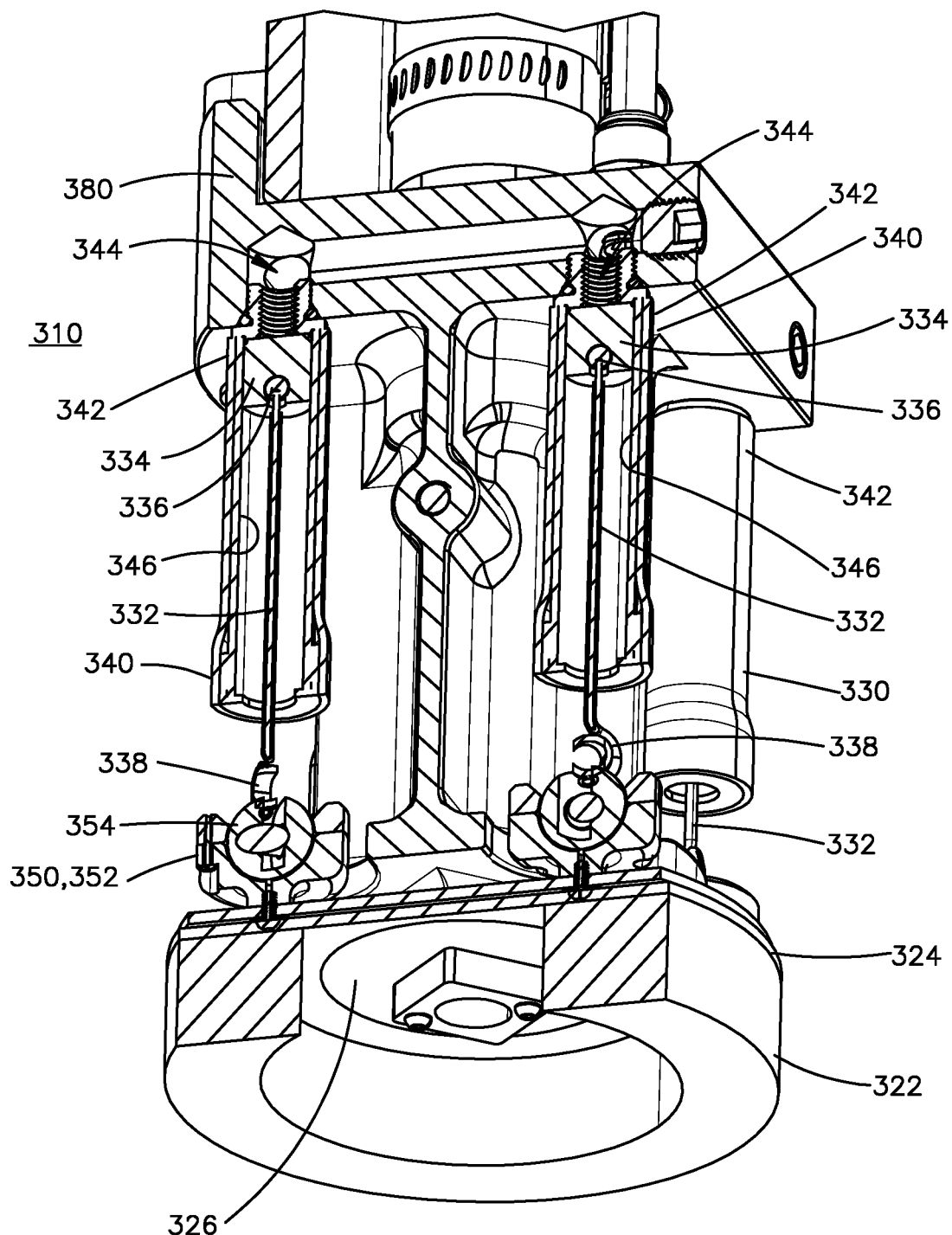
FIG. 17 is a cross-sectional, enlarged view of the end effector or FIG. 11.
Figure 18:
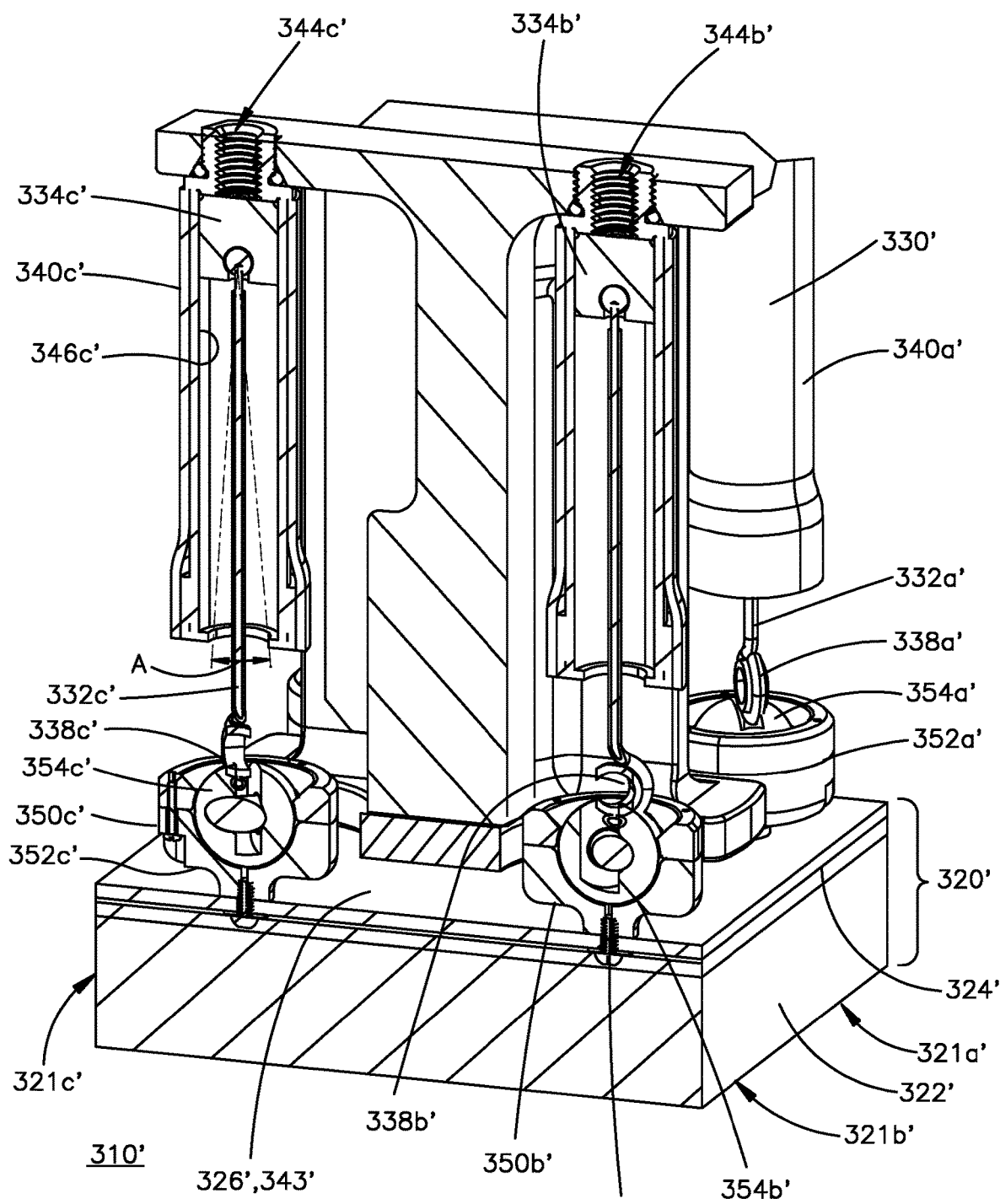
FIG. 18 is a perspective view of another embodiment of the end effector, illustrating four low-friction, single-acting pneumatic cylinders and a rectangular vacuum-gripper assembly.
Figure 19:
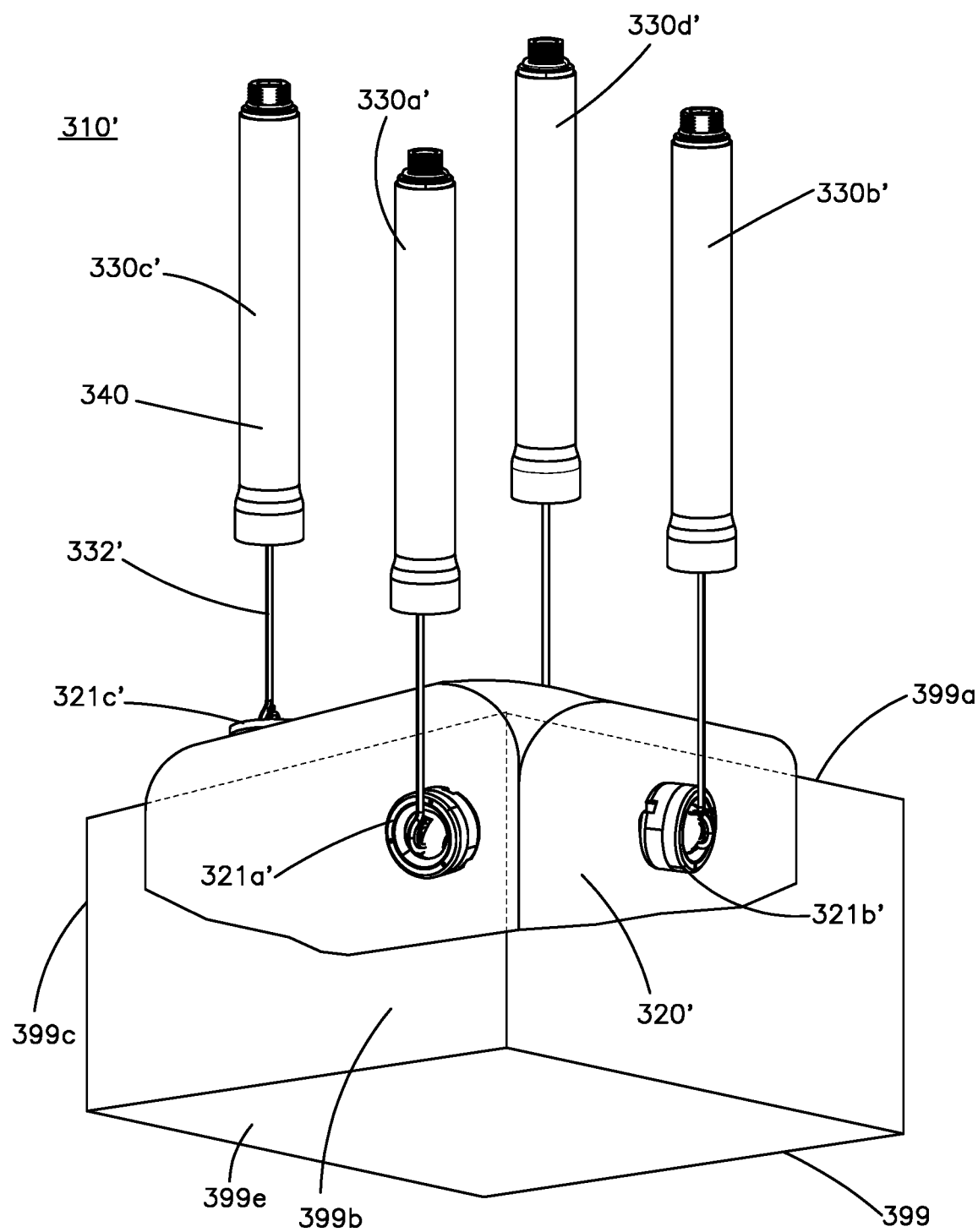
FIG. 19 is a perspective image of the end effector of FIG. 18, illustrating a square vacuum-gripper assembly and four linear actuators that are actuated to engage the corner of a box.

Various shapes of the vacuum-gripper assembly are illustrated in the drawings, such as in FIGS. 3-8 and 11-17, illustrating a circular vacuum-gripper assembly, and FIGS. 18 and 19, illustrating a rectangular or square vacuum-gripper assembly.

Figure 1:
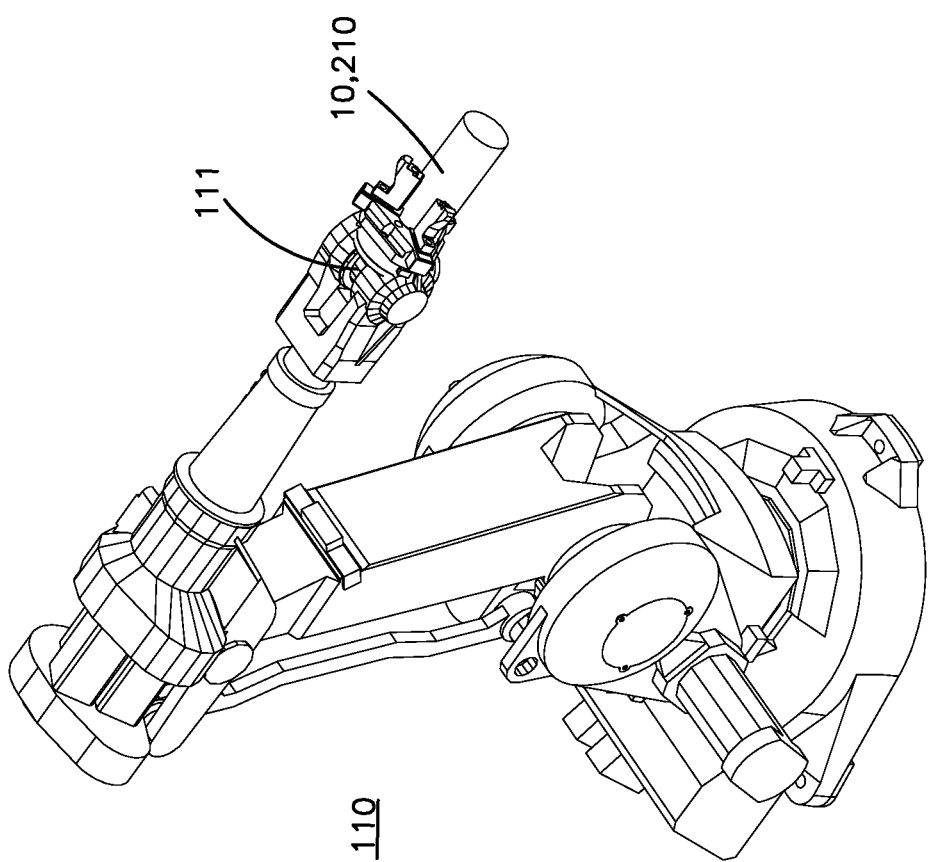
FIG. 1 is a schematic view of a robot employing an end effector disclosed herein.

A robot, such as a gantry or a six-axis robot 110 illustrated in FIG. 1, includes an end effector 10 or 210 or 310, 310', that is capable of grasping an object, and at least in some cases the end effector at least partially adapts or conforms (in shape) to the object to enhance gripping. End effector 10 or 210 or 310, 310' includes a vacuum-gripper assembly that includes a pliable vacuum-gripper body having a distal end adapted for contacting the object and a proximal face or end. Optionally, a flat or planar resilient structural ring or plate can be coupled to the proximal side of the vacuum-gripper body opposite the contact surface. A pliable sealing bellow or sealing membrane is coupled to the ring or plate and extends radially inwardly from the structural ring or plate. A connector, which can be at the center of the vacuum-gripper in embodiments in which the vacuum-gripper is symmetrical, can be configured to attach to a vacuum port. Other vacuum-gripper configurations are contemplated.

The vacuum-gripper assembly has a rest or unactuated state or position and an engaged or deformed state or position. In its rest position, the vacuum-gripper is typically in its conventional, flat position in which the contact surface of the vacuum-gripper is planar. Perfect flatness is not required for the surface of the vacuum-gripper to be considered to be planar, as used herein. Upon application of vacuum, and/or upon actuation by actuators, such as linear actuators described below, the vacuum-gripper can deform to conform to the shape of an object. In this regard, in some circumstances the only actuation required for compliance of the vacuum-gripper assembly to the item or object to be grasped is application of vacuum pressure to the vacuum-gripper when near the item. In other circumstances, actuation is provided or enhanced by actuators, such as pneumatic linear actuators.

In some embodiments, low-friction pneumatic cylinders are employed to enhance the ability of the end effector to return the vacuum-gripper assembly to the rest position. The resilience of the vacuum-gripper itself may be sufficient to move the air cylinders to their rest positions. Other configurations are contemplated, including but not limited to actuators having a spring-biased return, a double acting air cylinder (that is, in which air pressure is applied to the distal end of the air cylinder piston), and the like.

In general, the vacuum-gripper assembly is configured to conform to and grasp an object upon application of vacuum and (i) to be compliant such that it is conformable to the object upon application of vacuum, (ii) to lift an object after engagement, and (iii) to resiliently return to its rest state upon disengagement with the object. Thus, the optional resilient ring or plate or strip (in the embodiment of the figures) can have the function of providing a structure that connects between the vacuum-gripper ring or plate or strip and the sealing membrane, of being resilient to spring bias or aid in biasing the vacuum-gripper assembly to its rest position (which can be planar) and also sufficiently deformable to enable the foam to conform itself to the object (which can have a wide variety of shapes and sizes) and be strong enough to transmit the load from the vacuum-gripper to the membrane. In several embodiments, upon disengagement, the vacuum-gripper can return to any initial or final configuration based on inputs via a control system, as described in more detail below. The vacuum-gripper body can be formed of a foam (as explained more fully below) that also is resilient. At least the ring or plate can be capable of bending about an axis or conforming in other ways. In the embodiments of the figures, the ring or plate or strip can deform about any axes, and can be isotropic in this regard (as defined below) when circular. In embodiments having three or more linear actuators, the vacuum-gripper assembly can be configured to have no single, discrete axis of bending, but rather have a bending axis that depends on the profile (in top view in its rest state) of the vacuum-gripper, the number and location of the actuators, the contours of the item being grasped, and like parameters.

The vacuum-grippers in the embodiments shown in the figures can be any material, including a resilient foam, and has an aspect ratio, durometer, tensile strength, shear strength, and compression set and density to enable it to readily deform—with the structural ring or plate, or on its own, without the plate—in response to the vacuum applied to its interior when in contact with or near an object, to enable it to conform to the shape of the object, to enable it to grip the object, and to enable it transmit the load from the object to the ring or plate during lifting. Further, the vacuum-gripper body and/or ring or strip in some embodiments is sufficiently resilient to return a linear actuator to its retracted, ready position, as explained more fully below. The term "vacuum-gripper" is used herein to refer broadly to any structure that is capable of grasping an item via application of vacuum pressure and/or mechanical grasping, and is not limited to any particular shape or configuration.

The membrane in the embodiments shown in the figures is flexible, preferably along any axis to enable it to readily deform with the structural ring or plate and to enable it to transmit the load of the object from the ring or plate to a connector that is affixed to an end effector (which phrase encompasses various structures and configurations, including indirect coupling).

Thus, the optional structural ring or plate or strip can be made of a resilient material to supply a spring force or enhance a spring force to bias the vacuum-gripper assembly to the rest position, such that after release of the item and release of the vacuum pressure, the vacuum-gripper assembly returns to its rest position. The term "pliable" as used herein refers the property of being easily elastically deformed. The term "resilient" as used herein refers to the property of being deformable and then, upon release of the deforming force, tending to return to its undeformed, rest position.

The sealing bellows or membrane may be formed of a pliable material that provides an air seal (which term "seal" encompasses an imperfect sealing material or sealing configuration that merely inhibits air leakage). The connector may be of any type, such as an elastomer or other flexible or inflexible grommet or nipple of any configuration. The vacuum-gripper assembly may have isotropic stiffness in the plane defined by the structural ring or plate while the vacuum-gripper assembly is in the rest position. In this regard, the stiffness of the vacuum-gripper assembly is the same regardless of the axis of bending (in the plane of the vacuum-gripper). The sealing bellows or sealing membrane can be planar.

In embodiments having isotropic stiffness, the vacuum-gripper assembly may be easily and quickly installed on an end effector body or vacuum system fitting or tube via a quick-change grommet. The quick-change grommet can include a rim of pliable material, a nipple, a barbed connection, or the like.

The isotropic stiffness enables the vacuum-gripper assembly to have the same deformation in response to forces applied to the vacuum-gripper (such as suction pressure that induces movement of the vacuum-gripper) regardless of the angular position at which it is installed on the vacuum port, as the bending properties are the same about the vacuum-gripper. Other vacuum-grippers having a fixed, structural hinge require angular alignment with the end effector structure to enable the end effector to actuate the vacuum-gripper, and the end effector must then place the hinge axis in the desired orientation relative to the object.

In the embodiments disclosed herein having isotropic stiffness, the alignment required by a fixed, structural hinge is unnecessary because the vacuum-gripper disclosed herein can bend or conform regardless of its axial position on the end effector and regardless of its orientation relative to the object, and in this regard has multiple axes of bending. Further, the vacuum-gripper structure disclosed herein can be lightweight and, when formed of inexpensive materials, can be disposable and/or changed for different sizes or shapes of vacuum-gripper assemblies that are desired.

The structural ring or plate can be formed of a spring steel or a flexible polymer, such as a urethane, an ethyl vinyl acetate (EVA), a polyurethane, a thermoplastic urethane (TPU), moldable or extrudable or cast polymers such as thermoplastic elastomers (TPEs), thermosets such as liquid-injection-molded (LIM) or compression molded silicone or other material, depending on the desired functional aspects of the vacuum-gripper, and other parameters, such as diameter, magnitude of vacuum pressure, whether biasing springs are employed, and like parameters.

The vacuum-gripper body can be formed of a pliable material, such as a material comprising an open cell rubber sponge. For example, the vacuum-gripper body may include moldable, cast, and/or extrudable polymers. The vacuum-gripper body may be formed of a mixed media/mixed polymer composition that may undergo a baking or curing process during forming. The vacuum-gripper body may include a natural latex, which in some configurations can provide good compression set characteristics and good tear resistance. In accordance with the above examples, the vacuum-gripper material may be chosen based on the properties of density, porosity, compression set, tear resistance, conformability, and ability to grip another surface by surface friction. The optional structural ring or plate or strip will typically be stiffer, and in some embodiments have, e.g. at least twice the stiffness, of the soft, deformable foam.

In embodiments having actuators, the vacuum-gripper assembly can have ears, recesses, or like structure for coupling to the actuators and/or receiving linear force for actuation between the rest position and engaged position. In some embodiments, the vacuum-gripper assembly can have a ball and socket or gimbal that connects to a pivoting rod of a linear actuator. For embodiments omitting actuators, the vacuum-gripper assembly can optionally have ears (that is, any protrusion or recess) for receiving springs for biasing the vacuum-gripper assembly (not shown in the figures).

A method of grasping an item using an end effector includes: positioning the end effector relative to the object; applying linear force via linear actuators to deform the vacuum-gripper assembly and applying vacuum pressure to an interior chamber of a vacuum-gripper assembly of the end effector such that the vacuum-gripper conforms to a shape of the object and such that a structural ring or plate of the vacuum-gripper assembly flexes about the object in response to the applying vacuum pressure step, whereby the vacuum-gripper grasps the object; moving the end effector to transport the object after the applying and grasping steps; and releasing the object after the moving step to release the object from the vacuum-gripper assembly. The step of positioning the end effector can be performed by any method, and may be conventional. The resilience of the vacuum-gripper assembly can return the linear actuators to their retracted, at-rest position.

The embodiments shown in FIGS. 12 through 18 are configured to be capable of grasping items, such as a corner of a cuboid, such as a corrugate paperboard box. When the vacuum-gripper assembly is employed to grasp a multi-surface item, such as a box, a first actuator applies a force to deform a first portion of the vacuum-gripper assembly toward a surface, such as a horizontal top surface of a box, a second actuator applies a force to deform a second portion of the vacuum-gripper assembly toward another surface, such as a first vertical sidewall of the box, and a third actuator applies a force to deform a third portion of the vacuum-gripper assembly toward another surface, such as a second vertical sidewall of the box. The second and third actuators can be on opposing sides of the vacuum-gripper assembly, and the first and second vertical sidewalls are normal to each other. A square or rectangular vacuum-gripper assembly may be employed for grasping the box corner, two sides of the box that meet at intersecting planes, and other operations.

The step of applying vacuum pressure can include applying vacuum pressure such that a vacuum-gripper body, the structural ring or plate, and a sealing membrane that extends inwardly from the structural ring or plate conform to the shape of the object upon the applying vacuum pressure step. The vacuum-gripper assembly can have isotropic stiffness in a plane defined by the structural ring while the vacuum-gripper assembly is in the rest position, and the vacuum-gripper assembly can conform to the shape of the object regardless of the orientation of the vacuum-gripper body relative to the object. In several embodiments, these steps can be performed solely by the application of vacuum pressure, without external actuators (other than the end effector positioning the vacuum-gripper).

The vacuum-gripper assembly can be connected to a vacuum port by pushing a connector of the vacuum-gripper assembly onto or into the vacuum port while the sealing membrane of the vacuum-gripper assembly is planar, which step can be performed quickly and easily without tools.

Figure 2:
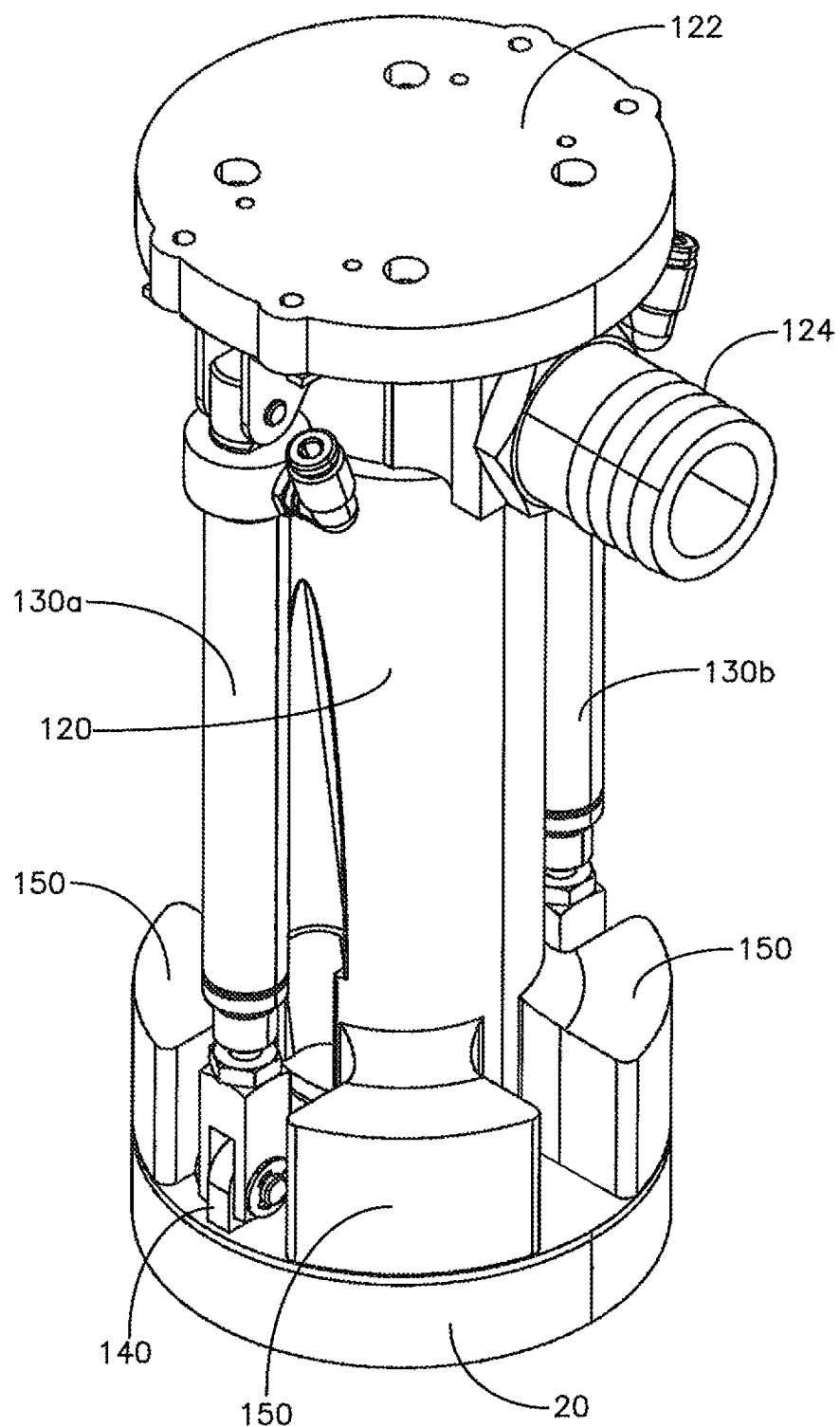
FIG. 2 is a perspective view of an end effector disclosed herein.
Figure 3:
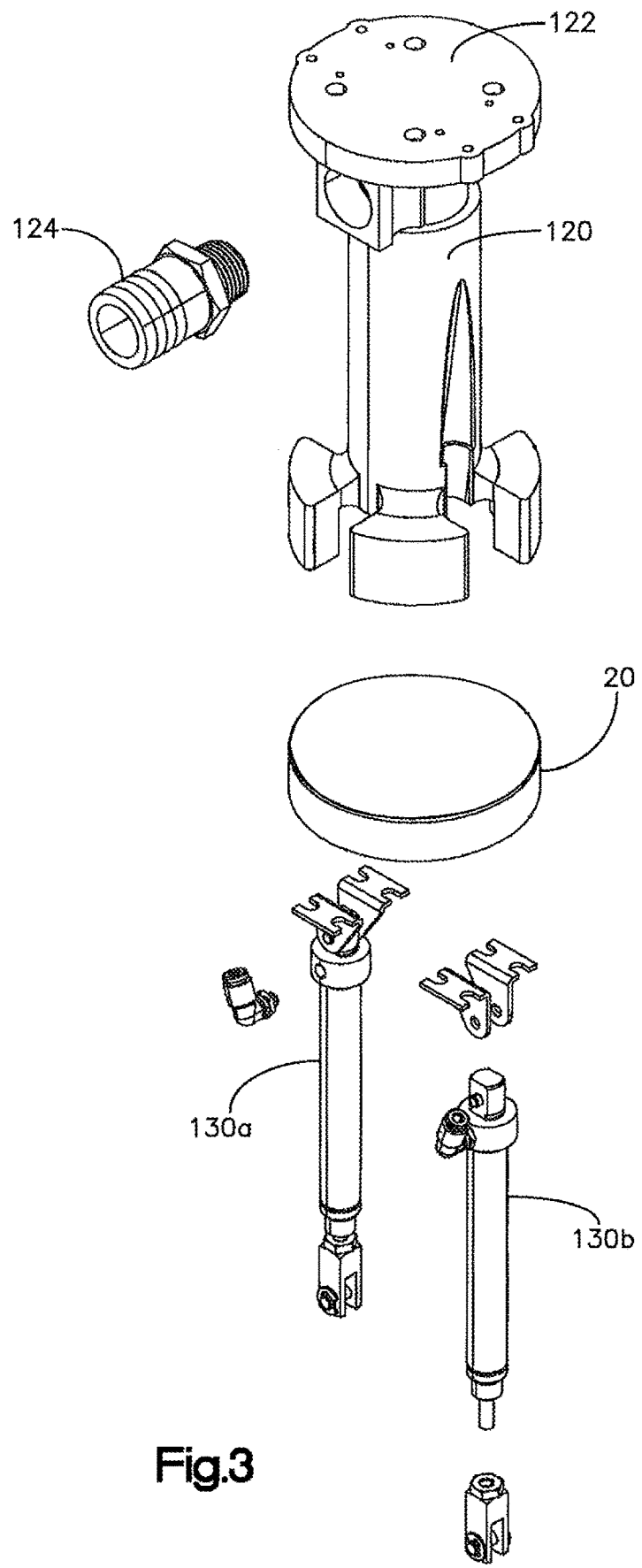
FIG. 3 is an exploded view of the end effector of FIG. 2.

Referring to FIGS. 1 through 3, an end effector 10 includes a structural body 120 having a mounting plate 122 for mounting to the arm 111 of robot 110, and a vacuum suction port 124 that transmits vacuum from a vacuum source (not shown in the figures) through body 120 and to a vacuum-gripper assembly 20. The inboard surface of vacuum-gripper assembly 20 forms a chamber, as described more fully below. A pair of linear actuators, such as pneumatic actuators 130a and 130b extend from a proximal portion (that is, the portion nearest the robot) of body 120 to an ear 140 attached to vacuum-gripper assembly 20.

In operation, actuators 130a and 130b extend to bend vacuum-gripper 20 from the rest position shown in FIG. 2 to an engaged position about an axis defined by the function of the actuators. Stops 150 are formed on a distal end of body 120 to register vacuum-gripper 20 into its rest position. Vacuum-gripper 20 can have the structure and function (such as conforming capabilities) of the vacuum-gripper assemblies described herein.

As partly schematically illustrated in FIG. 3, a first embodiment vacuum-gripper assembly 20 includes a vacuum-gripper body 30, a structural ring 50, a bellows or sealing membrane 60, and a connector 70. Vacuum-gripper body 30 forms a chamber 36 within the vacuum-gripper, and can be an open celled rubber sponge having a density of 0.25. An example of the density the foam that can be used is 300 kg/m^3. The body 30 may also be a hybrid material such as natural latex enhanced urethane foam or block copolymers. The durometer of the foam can range from Shore 25A to 65A. In some embodiments, the compression set at warehouse temperature, 10 C to 35 C, should be less than 20%, such as less than 5%.

The material of vacuum-gripper body 30, in many circumstances, may be chosen for its ability to easily conform to an object during the grasping phase and to elastically regain its un-deformed shape after actuation. Thus, many other materials may be used, such as (for non-limiting examples) polymeric foams such as nitrile rubber foam, polyurethane foam, silicone foam, polychloroprene foam (neoprene), and the like. In many, the material of vacuum-gripper body 30 is easily compressible.

In several embodiments, vacuum-gripper 20 is a circular ring, although other shapes, such as oval, irregularly shaped, rectangular, etc. may be employed according to the desired characteristics of the application. Thus, the present invention is not limited to any particular configuration or material for forming the vacuum-gripper.

Structural ring 50 may be formed of a thin 316 stainless spring steel. In some examples, the ring 50 may be an annealed 303 SS, and in other examples a urethane having a shore 90 (A) durometer. Ring 50 is attached to a proximal surface 24 of vacuum-gripper body 30, such as by an adhesive. Any attachment means may be employed to couple ring 50 and vacuum-gripper body 30 together. The term "couple" is used broadly herein to refer to structures being relatively held together, either in direct contact with one another or indirectly by having other components or materials between the structures.

Sealing membrane 60 can be a planar disk formed of an impermeable sheet, film, or fabric that is coupled to and sealed to ring 50 by a ring 62 of pliable, soft transition material. The material of ring 62 may include a wide variety of materials chosen for its function of adhering and sealing membrane 60 and ring 50 together without unduly increasing bending stiffness. For example, an ethyl vinyl acetate (EVA), a polyurethane, and the like may be used. Other non-limiting examples of pliable materials include elastomeric materials such as latex, rubber, and silicone. Any other means for attaching or adhering membrane 60 to ring 50, such as adhesives, mechanical fasteners (including screws, locking rings, clamps, and the like), sewing, melting or welding, and the like, may be employed.

Axes A1 and A2 in the plane of ring 50 are drawn arbitrarily to illustrate the isotropic stiffness of vacuum-gripper 20. In this regard, vacuum-gripper 20 will have a stiffness that is the same about all axes A1, A2, and others in the plane of ring 50 and/or in the plane of contact surface 32. Thus, the bending response or like deflection in response to a given force is the same about any axis A1, A2, etc.

Figure 4:
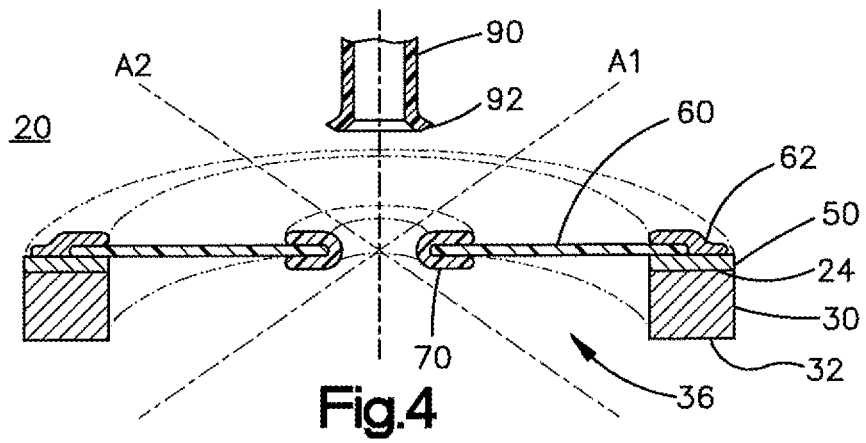
FIG. 4 is a perspective view of a first vacuum-gripper assembly embodiment.

Connector 70 in the embodiment of FIG. 4 is a ring of pliable, soft material, and may be the same or like material as that used for ring 62, or any other conventional elastomer or conventional sealing material. Connector 70 is connected to an aperture or through-hole in sealing membrane 60, and wraps around the aperture to form a C-shape in cross section. A vacuum port 90, shown schematically in FIG. 4, can be a rigid tube or housing, a flexible hose that is supported by other structure, or any other structure that can deliver vacuum pressure to vacuum-gripper assembly 20 and provide a structure with which connector 70 can interface in order to mechanically retain vacuum-gripper 20. As an example, port 90 includes a barb 92 protruding from the outboard surface at or near its lower lip or rim. Barb 92 is circular and continuous for ease of application to vacuum-gripper 20; other configurations are contemplated.

Figure 5:
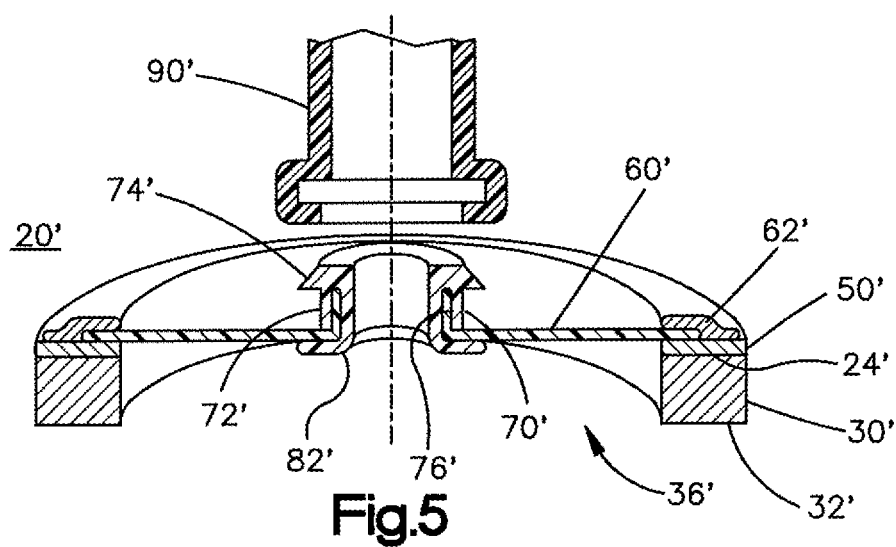
FIG. 5 is a view of a second vacuum-gripper assembly embodiment.
Figure 6:
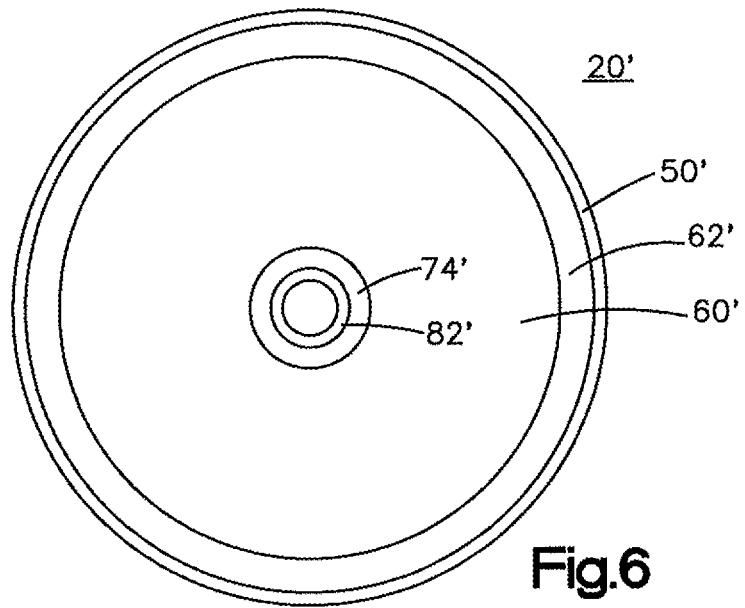
FIG. 6 is a top view of the vacuum-gripper assembly of FIG. 5.

FIG. 5 illustrates a second embodiment of a vacuum-gripper 20' that includes a vacuum-gripper body 30', a structural ring 50', a bellows or sealing membrane 60', and a connector fitting 70'. Body 30' and ring 50' may be as described for first embodiment body 30 and ring 50. Sealing membrane 60' can be attached to ring 50' as described above for first embodiment sealing membrane 60.

Connector fitting 70', as illustrated in FIG. 5, is a nipple or upstanding ring 72' having a circular, peripheral barb 74' protruding from the outboard side on or near its upper lip. The innermost lip or portion 64' of sealing membrane 60' wraps under and extends into the inboard surface 76' of fitting 70'. A pliable material 82' may be located over the interface between sealing membrane innermost lip 64' and the inboard surface of fitting 70'. Material 82' may be the same material as described above for material 62. Any other means for attaching or adhering sealing membrane 60' to fitting 70', such as adhesives, mechanical fasteners (including screws, locking rings, clamps, and the like), sewing, melting or welding, and the like, may be employed.

To install or apply vacuum-gripper 20 or 20' to connector 70 or 70', the vacuum-gripper may be merely applied by hand onto the connector, using force as needed to enable the barb 92 or 74' to snap or deflect into place. Other means for connecting the vacuum-gripper to the vacuum port, such as threaded connections, spring ball-type or other detents, locking pins with J-shaped channels, mechanical fasteners, temporary or releasable adhesives, magnets, and others may be employed.

Figure 7:
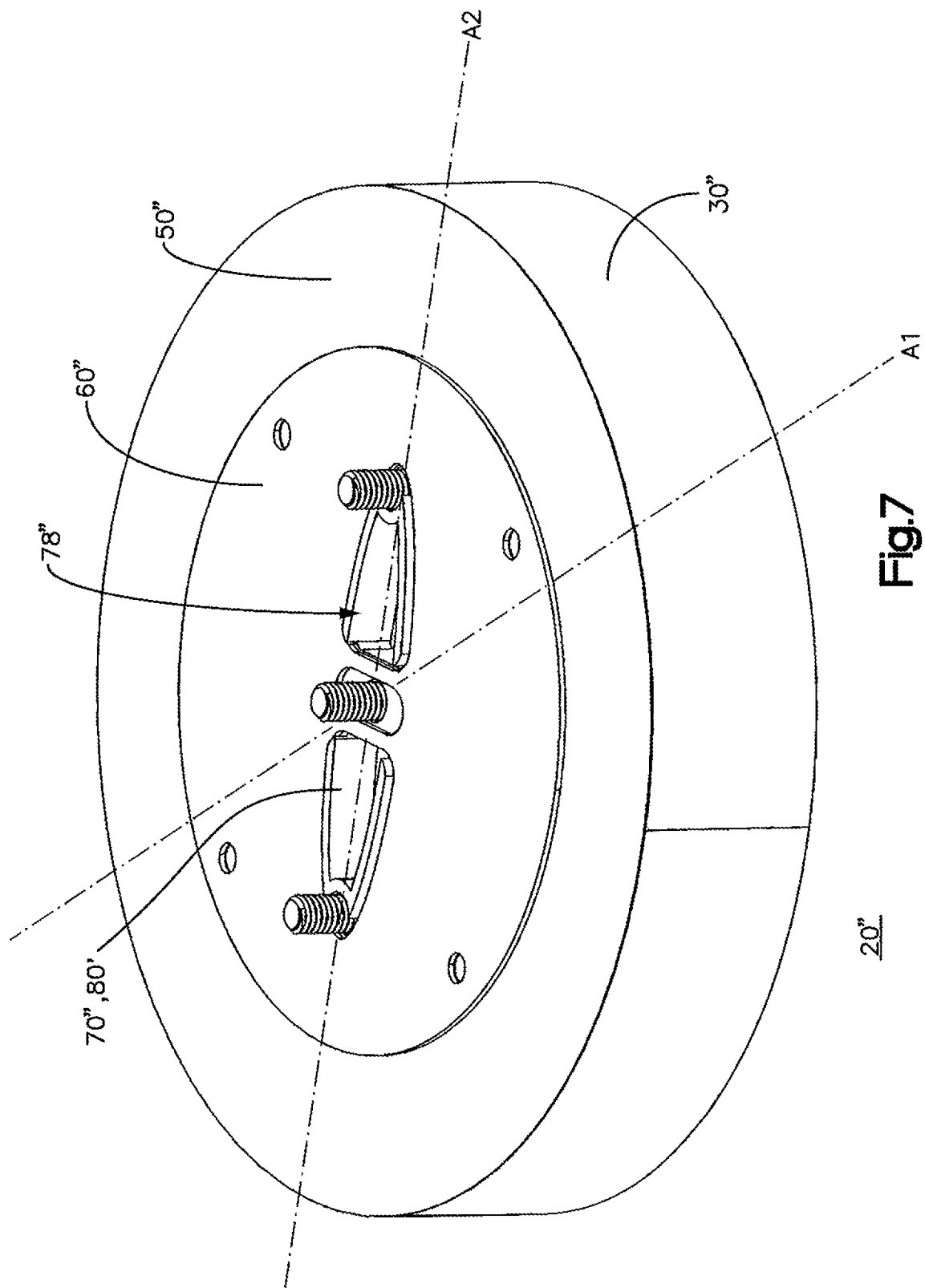
FIG. 7 is a perspective view of a third embodiment of a vacuum-gripper assembly.
Figure 8:
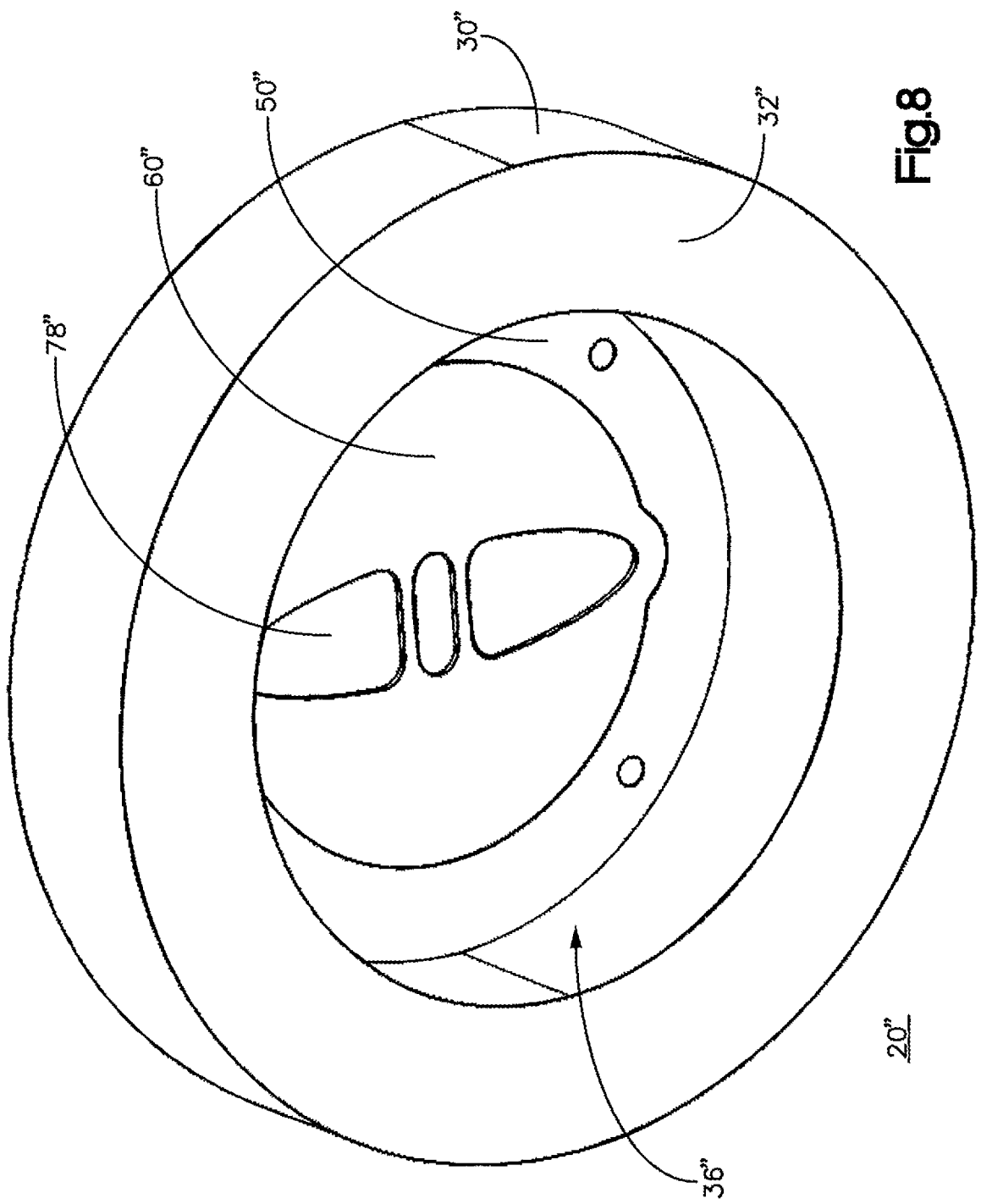
FIG. 8 is perspective, cross sectional view of an underside of the embodiment of FIG. 7.

FIGS. 7 and 8 are views of another embodiment of a vacuum-gripper assembly 20" that includes a vacuum-gripper body 30", a structural ring 50", a bellows or sealing membrane 60", and a connector fitting 70". Body 30" may be as described (that is, have the same structure and function) as first embodiment body 30, described above. Ring 50", as illustrated in the figures, is a disk that extends radially inwardly from an inboard surface of vacuum-gripper body 30" (as best illustrated in FIG. 8), and thus covers or extends over a portion of the interior chamber 36" formed by vacuum-gripper body 30". Sealing membrane 60", which can be attached to ring 50" as described above for first embodiment sealing membrane 60, extends from an inboard rim of ring 50" and includes openings 78" through which vacuum pressure is transmitted. A connector 70" includes an elongate metal fitting 80" that is attached to sealing membrane 60" by screws. Fitting 80" can attach to any corresponding structure of the end effector.

Openings 78" as illustrated in the figures are not radially symmetrical. Sheet 60" is formed of a pliable material, such as a fabric, and thus the asymmetrical openings do not materially affect the isotropic stiffness of vacuum-gripper assembly 20", apart from the metal connector 70". A Cordura™ nylon of 600 to 1,000 is an example of a product that may be employed to form the sheet of material. Alternatively or in combination, a synthetic leather materials such suede which may have similar properties in all directions may be used. Additionally, materials that have different properties in certain directions, such as elongation, may be used. An example would be 2× greater elongation in the x-axis vs the y-axis.

As illustrated in the drawing of vacuum-gripper 20", ring 50" is thin to promote ease of deformation and conformance. The thickness of ring 50, 50', and 50" can be chosen according to the particular parameters of the application, such as the magnitude of the vacuum pressure, diameter of the vacuum-gripper body, desired stiffness, and the like. A range of 0.0005 inches to 0.002 inches (one half to two thousandths) are examples of a steel ring thickness for a vacuum-gripper of two to five inches in diameter. For a polymer ring such as urethane, the range may be 0.010 to 0.150 depending on the mass of the object being captured and manipulated, and other parameters of the particular application.

Figure 9:
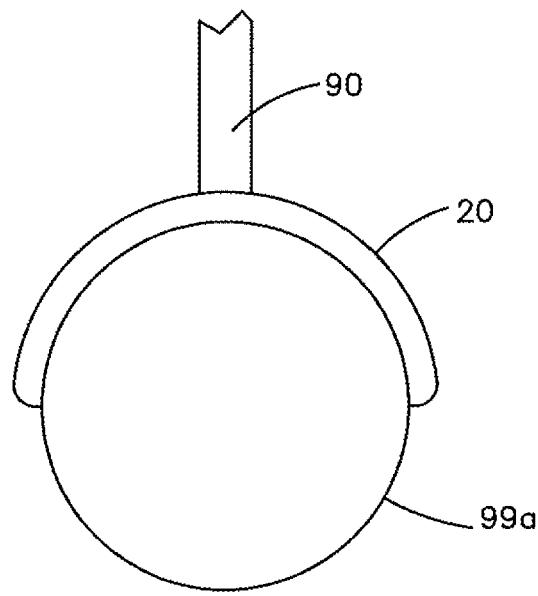
FIG. 9 is a schematic, end view illustration of a vacuum-gripper assembly engaging a cylindrical object.
Figure 10:
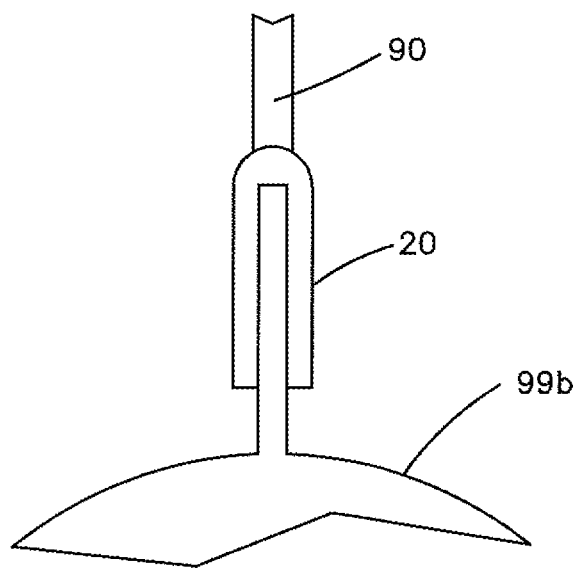
FIG. 10 is a schematic end view illustration of a vacuum-gripper assembly engaging a thin object.

FIGS. 9 and 10 schematically illustrate an engaged position of a vacuum-gripper 20. To illustrate grasping of a cylindrical object 99a, which is shown in end view in FIG. 8, for the vacuum-gripper (which is referred to by reference number 20 to refer to generally to any vacuum-gripper disclosed herein) when located near or in contact with object 99a, the magnitude of vacuum pressure in chamber 36 and the low stiffness of the vacuum-gripper assembly (about any axis A1, A2, etc., as illustrated in FIG. 7) induces vacuum-gripper assembly 20 to wrap around and conform (by taking or approximately taking the shape) to the cylindrical surface of object 99a. In this regard, the flexibility of vacuum-gripper 20 enables the profile of vacuum-gripper 20 to form a saddle shape, which in the end view of FIG. 9 is illustrated as a segment of a circular shape. Vacuum-gripper body 30 compresses and ring 50 deflects in a continuously varying profile to accommodate the curved cylinder during the engagement process.

FIG. 10 illustrates vacuum-gripper 20 applied to a flat portion of a blister pack 99b that has a flat, planar surface that extends above a plastic compartment, such as a package popular for retailing batteries and other small items. FIG. 10 also illustrates the concept of vacuum-gripper 20 grasping a book edge. As vacuum-gripper 20 is near or engaged with a top rim or lip of package 99b, vacuum-gripper 20 is drawn down over the flat portion of package 99b until all or a portion of vacuum-gripper 20 engages the flat portion of package 99b. Thus, vacuum-gripper 20 deforms by folding as if by forming a hinge. Vacuum-gripper body 50 compresses and hinge 50 is planar or nearly planar to match the planar shape of the flat portion of package 99b.

Figure 11:
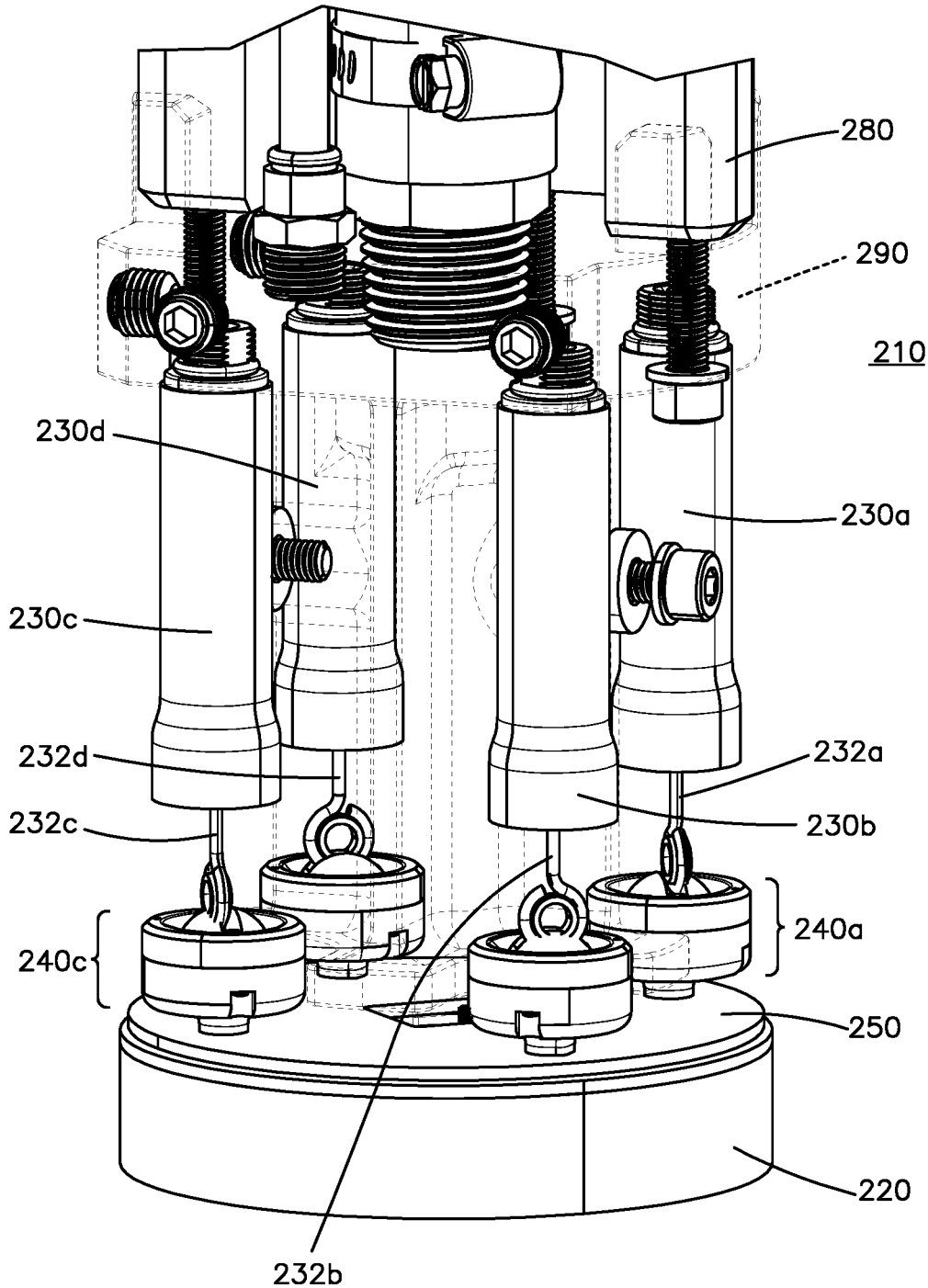
FIG. 11 is a perspective, solid model view of another embodiment of the end effector, illustrating a circular vacuum-gripper assembly and four linear actuators.

FIG. 11 illustrates an end effector 210 including a structural body 280. Mounting end effector 210 to arm 111 or robot 110 and supplying vacuum through body 280 to a vacuum-gripper assembly 220 may be as described for first embodiment end effector 10. The inboard surface of vacuum-gripper assembly 220 forms a chamber, as explained above for vacuum-gripper assembly 20.

Four linear actuators, such as pneumatic actuators 230a, 230b, 230c, and 230d, extend from a proximal plate (that is, a plate nearest the robot) of body 280 to a gimbal or ball and socket connection 240a, 240b, 240c, and 240d on vacuum-gripper assembly 220, at plate 250.

In operation, one or more of the actuators 230a, 230b, 230c, and 230d may extend from the rest position of FIG. 11 to deform the corresponding portion of the vacuum-gripper assembly at plate 250. Rods 232a, 232b, 232c, and 232d are pivotally connected to the ball of the corresponding connection to enable vacuum-gripper assembly and the rods to move freely during actuation.

FIGS. 12 through 17 illustrate an end effector assembly 310 that includes a vacuum-gripper assembly 320 that is configured to conform to and grasp an object upon application of vacuum and/or acuation of one or more linear acutators. End effector 310 (as illustrated in the figures) includes four linear actuators 330, which in the figures are pneumatic cylinders, such as Airpot Model 56P. When referring to specific actuators, the reference number 330 is appended with a letter designation, such that the actuactors 330 includes actuators 330a, 330b, 330c, and 330d.

In the embodiment of FIGS. 12 through 17, each eactuator 330 includes a rod 332, a piston 334, and a housing 340. A proximal end 342 of housing 340 is fixed to (or relative to) a structural body 380 of end effector 310. The fixed, proximal end 342 of each actuator 330 includes an aperture 344 for receiving compressed air for pneumatic operation of actuator 330. As best shown in FIG. 17, actuator housing 340 has an inner bore 346 in which piston 334 slides. A proximal end of rod 332 is attached to piston 334 by a pivoting connection 336. A distal end of rod 332 includes an interfacing structure, such as a hook 338, that can be connected to a pivoting connection, such as a ball and socket joint 350, as explained more fully below.

Vacuum-gripper assembly 320 can include a body 322, a ring 324, and a membrane or cover 326. The material of vacuum-gripper body 322, in many circumstances, may be chosen for its ability to easily conform to an object during the grasping phase and to elastically regain its un-deformed shape after actuation and/or to return the linear actuator to its retracted position. Thus, many other materials may be used, such as (for non-limiting examples) polymeric foams such as nitrile rubber foam, polyurethane foam, silicone foam, polychloroprene foam (neoprene), and the like. In many embodiments, the material of vacuum-gripper body 322 is easily compressible.

Figure 12:
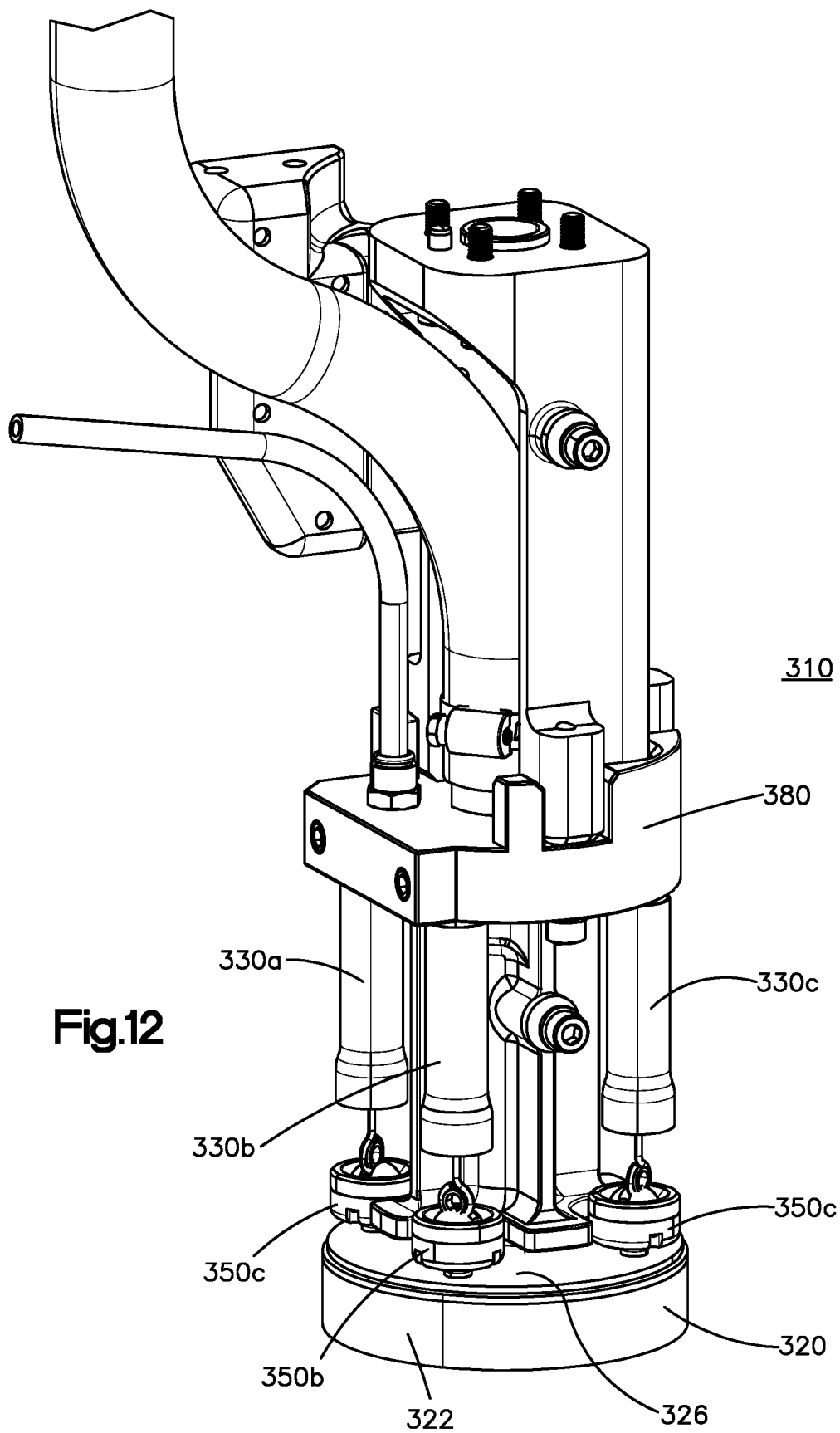
FIG. 12 is a perspective view of another embodiment of the end effector, illustrating four low-friction, single-acting pneumatic cylinders and a circular vacuum-gripper assembly.

FIG. 12 illustrates vacuum-gripper 322 is a circular ring. FIG. 18 illustrates a vacuum-gripper 322' having a square or rectangular profile (as viewed from above in its rest—that is, unactuated—state). Other shapes, such as oval, irregularly shaped, star-shaped, etc. may be employed according to the desired characteristics of the application. Thus, the present invention is not limited to any particular configuration or material for forming the vacuum-gripper.

Ring 324 may be formed of a urethane, and thin 316 stainless and/or spring steel may be used. In some examples, the ring 324 may be an annealed 303 SS, and in other examples a urethane having a shore 90 (A) durometer. Ring 324 is attached to a proximal surface of vacuum-gripper body 322, such as by an adhesive. Ring 324 is illustrated as two layers, which in some configurations enhances flexibility and hoop strength. Ring 324 may be configured such that the top layer is affixed to the actuator, such as the ball and socket connector described below and such that the lower layer is affixed to the vacuum-gripper 320. Thus, when replacing the vacuum-gripper assembly 320, the layers making up ring 324 may be used to decouple the vacuum-gripper 320, thereby enhancing its replacement and making the vacuum-gripper 320 disposable.

Any attachment means may be employed to couple ring 324 and vacuum-gripper body 322 together. The term "couple" is used broadly herein to refer to structures being relatively held together, either in direct contact with one another or indirectly by having other components or materials between the structures.

Sealing membrane 326 can be a planar disk formed of an impermeable sheet, film, or fabric that is coupled to and sealed to ring 324 by a wide variety of materials chosen for their function of adhering and sealing membrane 326 and ring 324 together without unduly increasing bending stiffness. For example, an ethyl vinyl acetate (EVA), a polyurethane, and the like may be used. Other non-limiting examples of pliable materials include elastomeric materials such as latex, rubber, and silicone. Any other means for attaching or adhering membrane 326 to ring 324, such as adhesives, mechanical fasteners (including screws, locking rings, clamps, and the like), sewing, melting or welding, and the like, may be employed.

Figure 15:
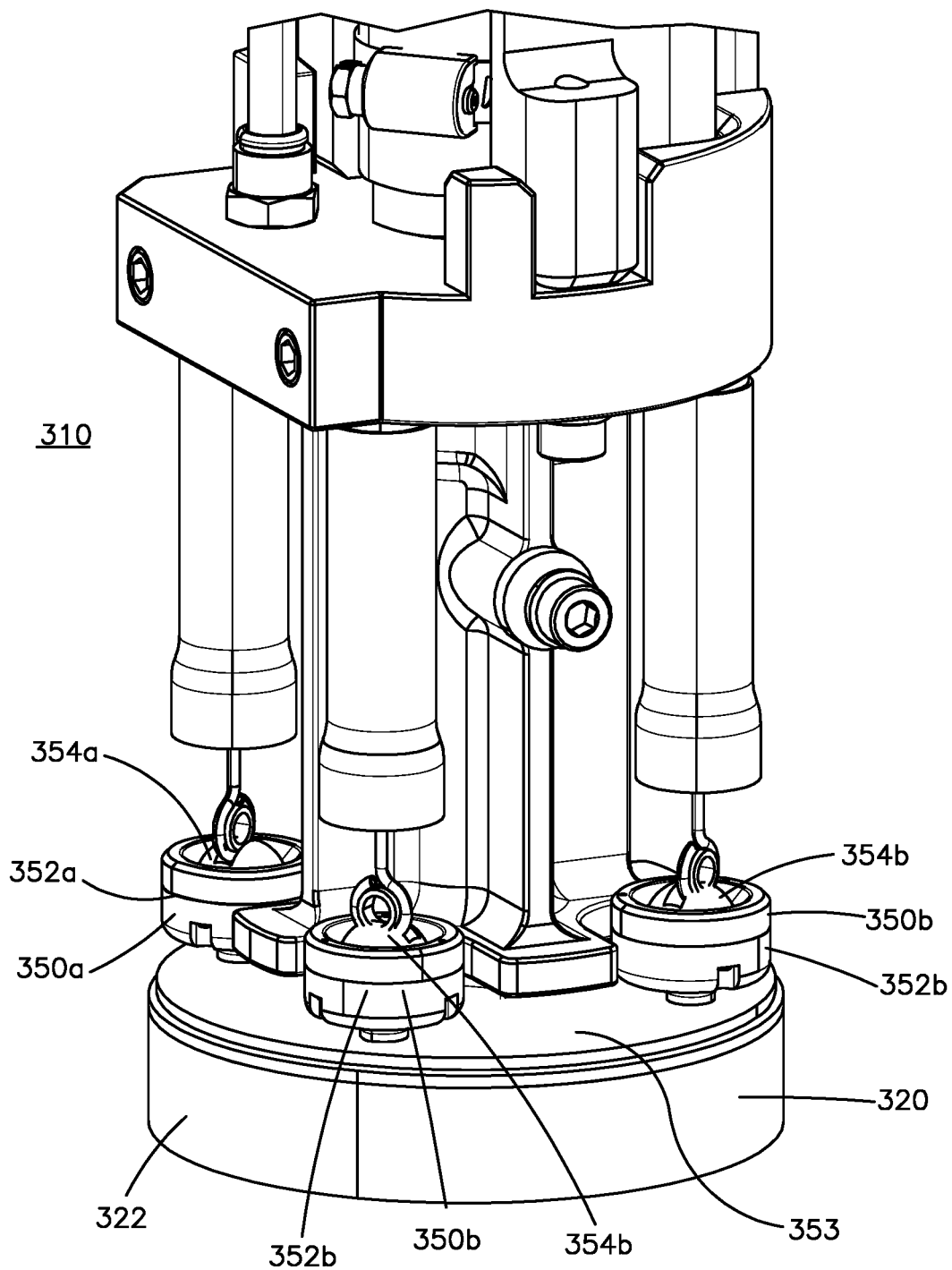
FIG. 15 is an enlarged, top perspective view of the end effector or FIG. 11.
Figure 16:
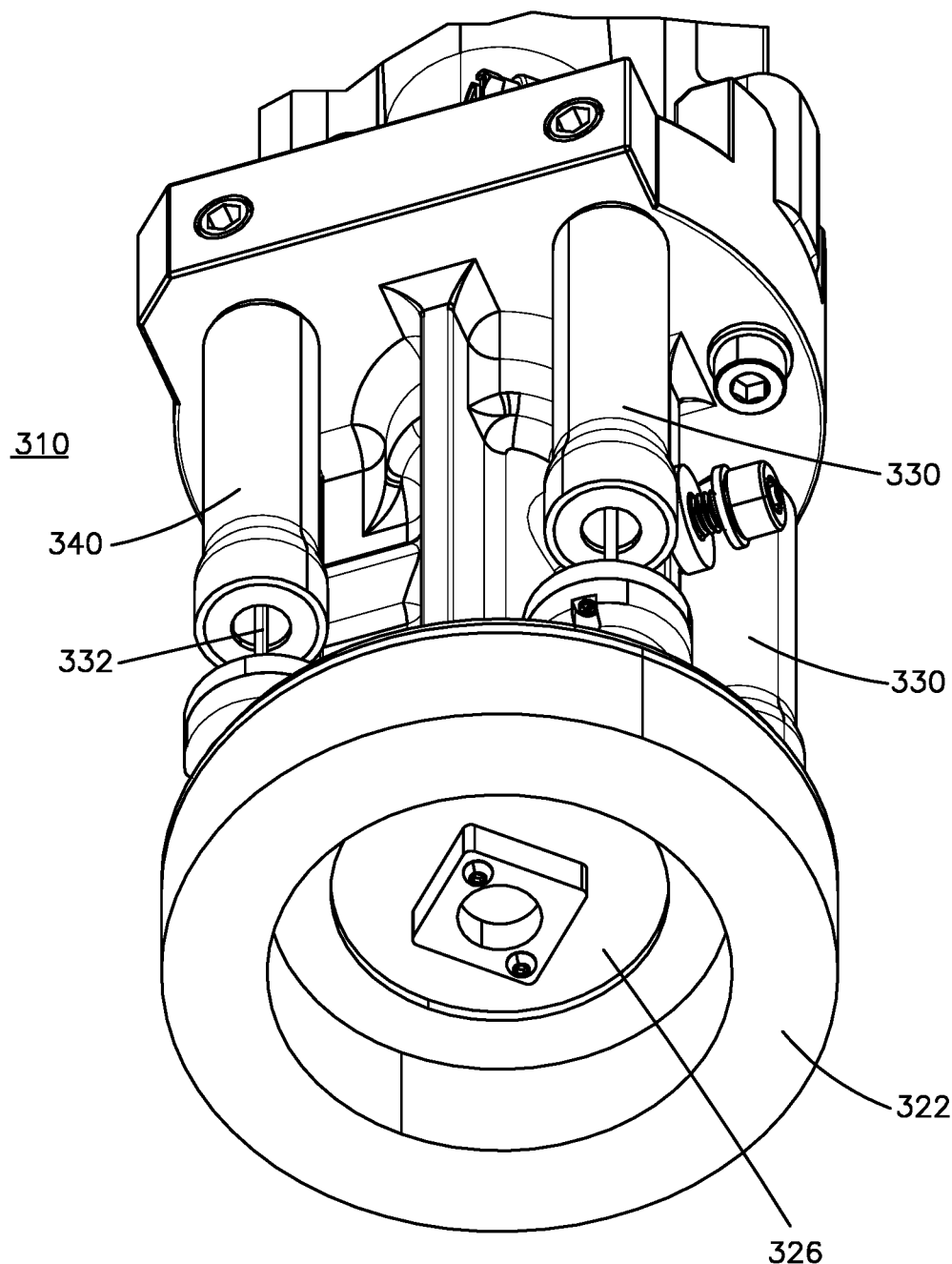
FIG. 16 is an enlarged bottom perspective view of the end effector or FIG. 11.

A ball and socket connector 350 is mounted to a proximal surface of vacuum-gripper assembly 320, as best illustrated in FIG. 15. In the embodiment of the figures, a socket 352 is affixed to a ring 353 that is attached to ring 324 of the vacuum-gripper assembly. Ring 353 may be as described above for ring 324. A ball 354 is held by socket 352 such that ball 354 can pivot in any direction. A distal end of the rod 334, which in the embodiment of FIG. 12 has a hook-shape 338, is connected to ball 354. Thus, rod 334 at its proximal end is connected to a ball-and-socket-type pivot 336 and at its distal end is connected to ball and socket connection 350 to enable the piston rod 332 to articulate, as explained more fully below.

FIG. 18 illustrates an end effector 310' assembly that includes square or rectangular vacuum-gripper assembly 320' that is configured to conform to and grasp an object upon application of vacuum and/or actuation of one or more actuators. End effector 310' (as illustrated in the figures) includes four linear actuators 330'. As illustrated, the linear actuators can be pneumatic cylinders, such as Airpot Model 56P. When referring to specific actuators, the reference number 330' is appended with a letter designation, such that the actuactors 330' includes actuators 330a', 330b', 330c', and 330d'.

In the embodiment of FIG. 18, each eactuator 330' includes a rod 332', a piston 334', and a housing 340'. A proximal end 342' of housing 340' is fixed to (or relative to)

a structural body 380' of end effector 310'. The fixed, proximal end 342' of each actuator 330' includes an aperture 344' for receiving compressed air for pneumatic operation of actuator 330'. Actuator housing 340' has an inner bore 346' in which piston 334' slides. A proximal end of rod 332' is attached to piston 334' by a pivoting connection 336'. A distal end of rod 332' includes an interfacing structure, such as a hook 338' that can be connected to a pivoting connection, such as a ball and socket joint 350', as explained more fully below. In several embodiments, and as illustrated in the figures, each one of the actuators 330*a*', 330*b*', 330*c*', and 330*d*' connects to a corresponding one of the corners 321*a*', 321*b*', 321*c*', and 321*d*' of the vacuum-gripper assembly.

Vacuum-gripper assembly 320' can include a rectangular body 322', a peripheral strip 324', and a membrane or cover 326'. The material of vacuum-gripper body 322', in many circumstances, may be chosen for its ability to easily conform to an object during the grasping phase and to elastically regain its un-deformed shape after actuation and/or to return the linear actuator to its retracted position. Thus, many other may be used, such as (for non-limiting examples) polymeric foams such as nitrile rubber foam, polyurethane foam, silicone foam, polychloroprene foam (neoprene), and the like. In many embodiments, the material of vacuum-gripper body 322' is easily compressible.

FIG. 18 illustrates a vacuum-gripper 322' having a square or rectangular profile (as viewed from above in its rest—that is, unactuated—state). Other shapes, such as oval, irregularly shaped, star-shaped, etc. may be employed according to the desired characteristics of the application. Thus, the present invention is not limited to any particular configuration or material for forming the vacuum-gripper.

Peripheral strip 324' may be formed of a urethane or a thin 316 stainless spring steel at or near the perimeter of a proximal side of the vacuum-gripper. In some examples, the strip 324' may be an annealed 303 SS, and in other examples a urethane having a hardness or stiffness chosen according to the desired characteristics, such as resilience and compliance, desired of vacuum-gripper assembly 320'. Strip 324' may be constructed in two layers, as described for first embodiment strip 324 above. Strip 324' is attached to a sealing membrane 326', which is attached to a proximal surface of vacuum-gripper body 322', such as by an adhesive. Any attachment means may be employed to couple strip 324' and vacuum-gripper body 322' together.

Sealing membrane 326' can be a planar disk formed of an impermeable sheet, film, or fabric that is coupled to and sealed to strip 324' by a wide variety of materials chosen for their function of adhering and sealing membrane 326' and strip 324' together without unduly increasing bending stiffness. For example, an ethyl vinyl acetate (EVA), a polyurethane, and the like may be used. Other non-limiting examples of pliable materials include elastomeric materials such as latex, rubber, and silicone. Any other means for attaching or adhering membrane 326' to strip 324', such as adhesives, mechanical fasteners (including screws, locking rings, clamps, and the like), sewing, melting or welding, and the like, may be employed.

A ball and socket connector 350' is mounted to a proximal surface of vacuum-gripper assembly 320' by any means. In the embodiment of figures, a socket 352' is affixed to a plate or membrane 343' that is attached to strip 324' of the vacuum-gripper assembly. The materials of membrane 343' may without limitation be as described above for strip 324', and other materials may be used. A ball 354' is held by socket 352' such that ball 354' can pivot in any direction. A distal end of the rod 334', which in the embodiment of FIG. 18 has a hook-shape 338', is connected to ball 354'. Thus, rod 334' at its proximal end is connected to a ball-and-socket-type pivot 336' and at its distal end is connected to ball and socket connection 350' to enable the piston rod 332' to articulate to accommodate the position of corners 321', as explained more fully below.

Rods 332*a*', 332*b*', 332*c*', and 332*d*' are pivotally connected to the corresponding pistons 334*a*', 334*b*', 334*c*', and 334*d*' on the proximal end of the rods and pivotally connected to corresponding ball and socket connector 350*a*', 350*b*', 350*c*, and 350*d*' at a distal end of the rods. Thus, the rods 332' can articulate within a cone of articulation (illustrated schematically in FIG. 18, by angle A) so as not to constrict vacuum-gripper 320' from compliance with an item to be grasped. Alternatively, a linear actuator having a rigid rod may be employed where a proximal end of the actuator housing is pivotally connected (not shown in the figures) to the structure 380' of the end effector. Membrane 326' and membrane 343' may be pliable, and may be inelastic or may be elastic to the degree of enhancing compliance for all possible positions of the vacuum-gripper 320'. Upon nearing item 399, negative pressure applied through vacuum-gripper assembly 320' can aid in the deformation and compliance of vacuum-gripper assembly 320' to grasp box 399.

The operation of the embodiment of FIG. 18 explained below also applies to the embodiment illustrated in FIG. 12 by merely substituting a circular vacuum-gripper assembly for a rectangular one, as will be understood by persons familiar with end effectors considering the present disclosure. In operation, end effector 310' may be moved into position relative to an item, such as a corrugate, paperboard box 399. One or more of the actuators 330*a*', 330*b*', 330*c*', and 330*d*' may extend from the rest position of FIG. 18 to deform the corresponding portion 321*a*', 321*b*', 321*c*', and 321*d*' of the vacuum-gripper assembly 320'.

Upon application of air pressure, the four actuators extend from a retracted (proximal), unactuated, at-rest position of FIG. 18. FIG. 19 illustrates an extended (distal) position of the actuators such that the portion 321*a*' of the vacuum-gripper assembly 320' associated with first actuator 330*a*' is engaged with atop, horizontal surface 399*a* of the box. The portion 321*b*' of vacuum-gripper assembly associated with second actuator 330*b*' is engaged with a first side, vertical face 399*b* of the box. The portion 321*c*' of the vacuum-gripper assembly associated with third actuator 330*c*' is engaged with an edge 399*e* of the box, which edge is formed at the junction or interface between vertical sides 399*b* and 399*c*. The portion 321*d*' of the vacuum-gripper assembly associated with fourth actuator 330*d*' is engaged with another side, vertical face of the box (not shown in FIG. 18).

Upon grasping, the end effector assembly 310' may lift and move the box 399 as desired. Upon release of vacuum pressure to vacuum-gripper 320', box 399 can be released from end effector assembly 310'. The preferred linear actuator illustrated in FIGS. 12 through 18 is single-action actuator that extends upon pressurization of the proximal side of piston 334'. The actuator may be of the type for which air pressure extends the piston rod, and pneumatic or mechanical mechanisms (which may be conventional) internal to the cylinder return the rod to the retracted position. The linear actuator also has low friction attributes, which can enhance the capability of the resilience of vacuum-gripper assembly 320' alone to return the actuators from the extended position to the retracted position. The present invention is not limited low-friction and/or one-way actuation actuators, but rather encompasses two-way actuation, spring biased actuation to retract the actuators or another other means alone or in combination with the structures and functions described herein.

Grasping a corner of box 399 (i.e., a right angle shape or feature) as illustrated in FIG. 19 can be beneficial in various circumstances, such as when box 399 is partially covered or blocked from access by other items, such as other packages. The function described herein, such as grasping a box corner of box 399, is not limited to a rectangular vacuum-gripper assembly, but rather may be achieved by any of the structures described herein. Further, the rectangular vacuum-gripper 320' is not limited to grasping cuboid or planar surfaces, as rectangular vacuum-gripper 320' may conform to the shape of the object to be lifted.

Figure 20:
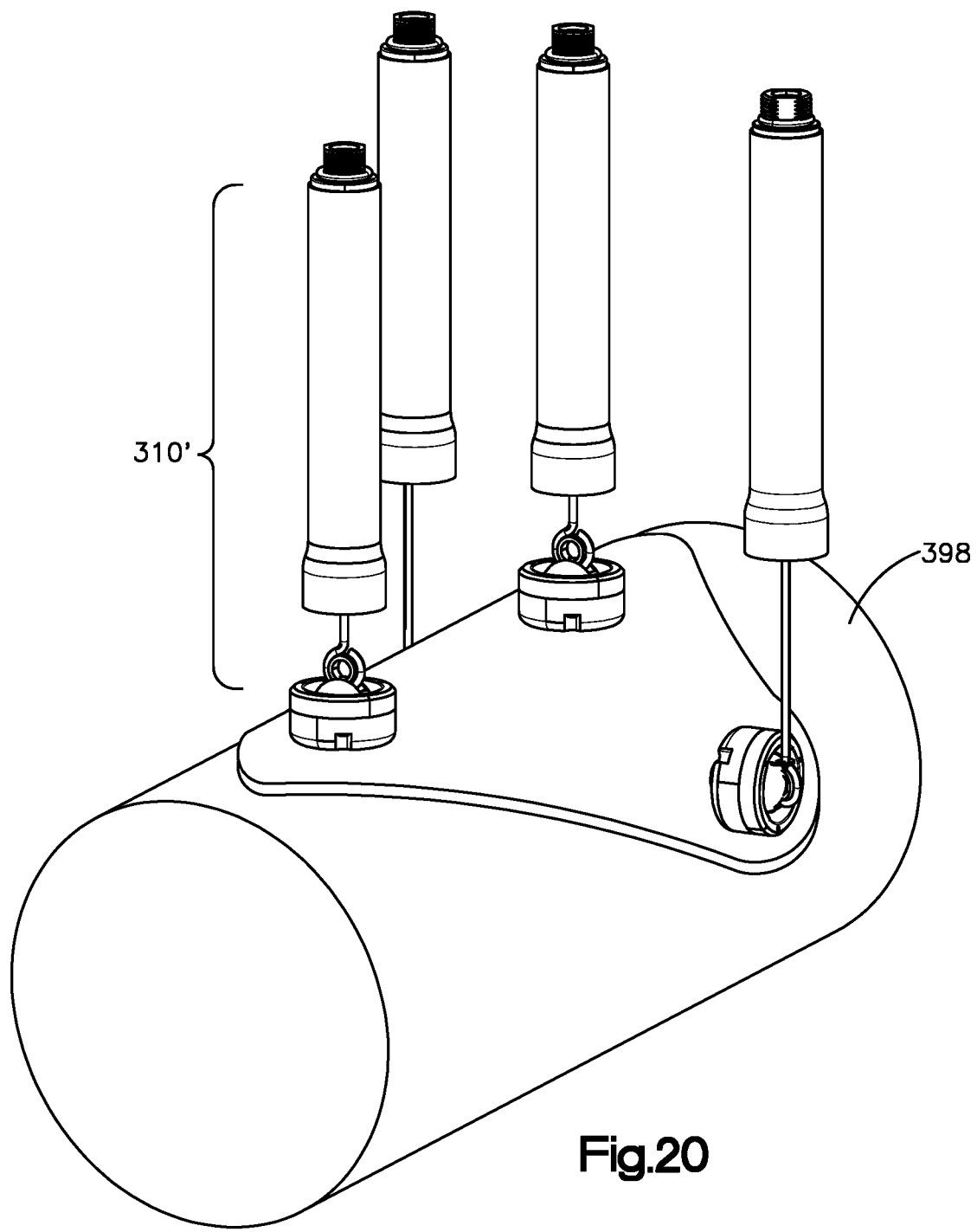
FIG. 20 is a perspective image of the end effector of FIG. 18 engaging a cylindrical item.

FIG. 20 illustrates end effector assembly 310' conforming to and grasping a cylinder 398.

Other configurations of the vacuum-gripper are contemplated. For example, a vacuum-gripper profile having straight sides and rounded corners of any radii may be employed such that the vacuum-gripper assembly may be viewed as being alternating curved or round portions and flat portions. The Figures illustrate that the vacuum-gripper assembly may be rectangular or square, and other shapes may be employed, including without limitation, triangular of any type or dimension, any other polygon shape, star shape, asymmetric, and the like. A person familiar with end effectors can configure the shape of the vacuum-gripper according to the particular goals of its end use. Any number of actuators may be employed, as the disclosure herein is employed merely to illustrate some of embodiments, without intended to be limiting.

Adding additional pistons to in some cases makes grasping more robust and allows the end effector to grasp more complex geometries. The use of four pistons makes the vacuum-gripper assembly significantly less sensitive to yaw orientation misalignment. The four piston design does not have a predefined bending axis and can bend along any axis. This allows the vacuum-gripper assembly to approach the surface in any yaw orientation and still be able to grasp the surface. This is advantageous because it reduces the burden on perception/sensing because you do not need to understand the principal curvature orientation of the object in order to grasp it.

The position and orientation of any of the end effectors disclosed herein may be controlled through instructions from the control system. Specifically, the control system may receive input from a human operator and/or a grasp planning program so as to employ custom grasping strategies for various shapes of items. For example, in relation to vacuum-type end effectors, six-sided boxes with planar surfaces may require only simple grasping strategies regardless of size and orientation. But items with more complex surfaces may be difficult to grasp, especially if these items are disposed in close proximity to other items and objects, such as when multiple items are disposed in a storage container such as a gaylord. Any number and types of sensors may be employed and affixed to the end effector, as needed and will be understood by persons familiar with vacuum-gripper end effectors in view of the present invention.

In some embodiments, the control system may receive data from one or more sensors (for example, optical, contact, proximity, etc.) disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two-dimensional image of the item showing a feature may allow an identification of a respective surface. If the two-dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

Control may also be via mechanical analog control where when vacuum is achieved. For example, when the cup captures the target object, the vacuum pressure at the end of arm tool increases rapidly. An analog mechanical vacuum valve may be employed to respond to the change in vacuum and freeze the shape of the vacuum-gripper once capture is achieved. Alternately the change in pressure at capture can be used to freeze motor motion once capture is achieved.

Alternately, if electric motors are used, the current into the motor will also indicate when capture is achieved. As the cup wraps around the captured object, further deformation of the cup is only possible by rapidly increasing the force applied by the motors. More force will not increase the capture, but may damage the cup and the captured article to be manipulated. When vacuum is achieved and the force (current into the motors) begins to increase, the motors can be configured freeze to prevent damage to the captured target article.

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The end effector structure and function are described herein by referring to advantages and specific examples or embodiments. The present invention is not limited to the advantages explained herein, nor to the structure or function of the examples or embodiments. Moreover, the text is intended to describe the specific embodiments shown in the figures. The structure and function shown and described is intended only for example. For non-limiting examples, the location of corresponding parts and their movements, the quantity and types of actuators, the shape of any vacuum-grippers, and the function descriptions are not intended to limit the scope of the invention. Rather, it is intended that the invention be given the full scope of the plain meaning of the claims.

What is claimed is:

1. A end effector assembly configured to conform to and grasp an item, the end effector assembly comprising:
    a vacuum-gripper assembly having a peripherally continuous profile in a rest state in top view, the peripherally continuous profile forming a sealing membrane in which a vacuum is formed;
    at least three linear actuators coupled to the vacuum-gripper and adapted for deforming the vacuum-gripper from the rest state upon actuation of the linear actuators; and
    the vacuum-gripper being pliable and adapted for deforming about multiple axes in response to actuation of the linear actuators and being resilient for returning to the rest state after actuation of the linear actuators.

2. The end effector assembly of claim 1 wherein each one of the actuators is pivotally coupled to the vacuum-gripper assembly at a distal end thereof.

3. The end effector assembly of claim 2 wherein each one of the actuators includes a piston and a rod, and the rod is pivotally connected to the piston.

4. The end effector assembly of claim 1 wherein each one of the actuators includes a piston and a piston rod, an upper ball and socket connection between a proximal end of the piston rod and the piston, and a lower ball and socket connection between a distal end or the piston rod and the vacuum-gripper assembly.

5. The end effector assembly of claim 1 wherein the profile is a circular profile.

6. The end effector assembly of claim 1 wherein the vacuum-gripper assembly is adapted to conform to a right-angle shape of the item.

7. The end effector assembly of claim 6 wherein the vacuum-gripper assembly can adapt to a corner formed at the junction of three planar surfaces of the item.

8. The end effector of claim 6 wherein the vacuum-gripper assembly has a rectangular profile in top view when at rest.

9. The end effector assembly of claim 1 wherein each one of the linear actuators is a one-way actuated air cylinder, wherein the air cylinder and vacuum-gripper are configured such that application of air pressure to the air cylinder moves the piston and rod from a retracted position to an extended position to deform the vacuum-gripper assembly, and wherein the air cylinder and vacuum-gripper are configured such that the vacuum-gripper is adapted to resiliently move the piston and piston rod from the extended position to the retracted position after removal of the air pressure to the air cylinder without air pressure applied to a distal side of the piston.

10. The end effector assembly of claim 1 further comprising a connector adapted to connect the end effector assembly to a robotic arm.

11. An end effector assembly configured to conform to and grasp an item, the end effector assembly comprising:
    a vacuum-gripper assembly comprising a contact surface that contacts the item, the contact surface being pliable and resilient such that the contact surface is biased toward a rest state;
    a plurality of air cylinders coupled to the vacuum-gripper assembly and adapted for deforming the contact surface of the vacuum-gripper assembly from the rest state upon actuation of the linear actuators, each one of the air cylinders being a one-way actuated air cylinder, wherein each one of the air cylinders and vacuum-gripper are configured such that application of air pressure to the air cylinder moves the piston and rod from a retracted position to an extended position to deform the contact surface of the vacuum-gripper, and wherein the air cylinder and vacuum-gripper are configured such that the vacuum-gripper resiliently moves the piston and rod from the extended position to the retracted position after removal of the air pressure to the air cylinder.

12. The end effector of claim 11 wherein the vacuum-gripper assembly has a non-circular profile in top view at rest.

13. The end effector assembly of claim 11 wherein each one of the actuators includes a piston and a rod, and the rod is pivotally connected to the piston at a proximal end of the piston rod.

14. The end effector assembly of claim 11 wherein each one of the actuators includes a piston and a piston rod, an upper ball and socket connection between a proximal end of a piston rod and the piston, and a lower ball and socket connection between a distal end or the piston rod and the vacuum-gripper assembly.

15. The end effector assembly of claim 11 wherein the vacuum-gripper assembly is adapted to conform to a right-angle shape of the item.

16. The end effector assembly of claim 11 wherein the vacuum-gripper assembly can adapt to a corner formed at the junction of three planar surfaces of the item.

17. The end effector of claim 11 wherein the vacuum-gripper assembly has a rectangular profile in top view when at rest.

18. A method grasping an item using an end effector, comprising the steps of:
    positioning the end effector relative to the item by way of a robotic arm to which it is attached;

applying air pressure to at least three air cylinders to move rods of the air cylinders from a retracted position to an extended position to change a shape of a pliable contact surface that contacts the item;

apply vacuum to an interior portion of a vacuum-gripper assembly of the end effector such that a vacuum-gripper further conforms the contact surface to a shape of the item, whereby the vacuum-gripper grasps the item;

moving the end effector to transport the item after the applying and grasping steps;

releasing the vacuum pressure after the moving step to release the item from the vacuum-gripper assembly; and removing air pressure from the air cylinders whereby the vacuum-gripper assembly resiliently returns the rods of the air cylinders to the retracted position.

19. The method of claim 18 wherein the apply vacuum step includes applying vacuum to the vacuum-gripper assembly to grasp surfaces of the item that form a right angle.

20. The method of claim 18 wherein the apply vacuum step includes applying vacuum to the vacuum-gripper assembly to grasp a corner formed at the junction of three planar surfaces of the item.

\* \* \* \* \*